(12) United States Patent
Nakanishi et al.

(10) Patent No.: US 8,168,334 B2
(45) Date of Patent: May 1, 2012

(54) NONAQUEOUS ELECTROLYTE SECONDARY BATTERY

(75) Inventors: Shinji Nakanishi, Osaka (JP); Hizuru Koshina, Osaka (JP)

(73) Assignee: Panasonic Corporation, Osaka (JP)

( * ) Notice: Subject to any disclaimer, the term of this patent is extended or adjusted under 35 U.S.C. 154(b) by 1174 days.

(21) Appl. No.: 11/606,184

(22) Filed: Nov. 30, 2006

(65) Prior Publication Data

US 2007/0092803 A1 Apr. 26, 2007

Related U.S. Application Data

(63) Continuation-in-part of application No. PCT/JP2005/011795, filed on Jun. 28, 2005.

(30) Foreign Application Priority Data

Jul. 16, 2004 (JP) ................................. 2004-209543

(51) Int. Cl.
*H01M 4/16* (2006.01)
(52) U.S. Cl. ...................................................... 429/326
(58) Field of Classification Search .................. 429/324, 429/326
See application file for complete search history.

(56) References Cited

U.S. PATENT DOCUMENTS

| | | | |
|---|---|---|---|
| 6,723,472 B2 | 4/2004 | Nakanishi et al. | |
| 6,733,927 B1 | 5/2004 | Takezawa et al. | |

FOREIGN PATENT DOCUMENTS

| | | | |
|---|---|---|---|
| CN | 1339182 A | 3/2002 | |
| CN | 1148828 C | 5/2004 | |
| JP | 10-189038 A | 7/1998 | |
| JP | 11-329495 A | 11/1999 | |
| JP | 3060107 | 4/2000 | |
| JP | 2000-149985 A | 5/2000 | |
| JP | 2000-260467 A | 9/2000 | |
| JP | 2000-348764 A | 12/2000 | |
| JP | 2002-25609 A | 1/2002 | |
| JP | 2002-33119 A | 1/2002 | |
| JP | 2002-231309 A | 8/2002 | |
| WO | WO 02/056408 A1 | 7/2002 | |

OTHER PUBLICATIONS

Chinese Office Action, issued in Chinese Patent Application 2005800239806 dated on Mar. 21, 2008.

*Primary Examiner* — Patrick Joseph Ryan
*Assistant Examiner* — Muhammad Siddiquee
(74) *Attorney, Agent, or Firm* — McDermott Will & Emery LLP (57) ABSTRACT

A non-aqueous electrolyte secondary battery including a positive electrode plate, a negative electrode plate, and a non-aqueous electrolyte containing a non-aqueous solvent and a solute dissolved in the non-aqueous solvent, wherein the non-aqueous electrolyte further contains a chain phosphoric acid ester and at least one imide salt represented by the formula (1):

[Chemical formula 1]

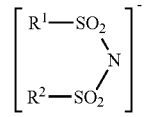

where $R^1$ and $R^2$ each independently represent $C_nX_{2n+1}$, X represents a hydrogen atom or halogen atom, and n is an integer equal to or greater than 1, and the amount of the chain phosphoric acid ester is 50 to 20000 ppm relative to the total weight of the non-aqueous electrolyte.

3 Claims, 1 Drawing Sheet

NONAQUEOUS ELECTROLYTE SECONDARY BATTERY

This application is a continuation-in-part of PCT International Application No. PCT/JP05/011795 filed Jun. 28, 2005.

TECHNICAL FIELD

The present invention relates to a non-aqueous electrolyte secondary battery having excellent high temperature storage characteristics comprising a non-aqueous electrolyte containing an imide salt and a chain phosphoric acid ester.

BACKGROUND ART

Lithium ion secondary batteries are the most typical example of non-aqueous electrolyte secondary batteries. Lithium ion secondary batteries have high energy density and can be reduced in size and weight. Usually, they have a structure as described below.

Lithium ion secondary batteries have an electrode assembly in which a positive electrode plate comprising a current collector and a positive electrode active material layer carried on the current collector and a negative electrode plate comprising a current collector and a negative electrode active material layer carried on the current collector are spirally wound with a separator serving as an isolation layer therebetween. This electrode assembly is housed into an outer case with a non-aqueous electrolyte. The separator is made of a material insoluble in non-aqueous electrolytes. For example, microporous films made of a polyolefin resin such as polyethylene resin and polypropylene resin, and polymer films containing polyethylene oxide, polyvinylidene fluoride or polyacrylate are used. The non-aqueous electrolyte is usually a polymer gel electrolyte or non-aqueous electrolyte solution. The polymer gel electrolyte is a polymer electrolyte containing a non-aqueous electrolyte solution.

The non-aqueous electrolyte solution comprises a solute such as a lithium salt dissolved in a non-aqueous solvent. The solutes include, for example, lithium hexafluorophosphate ($LiPF_6$). The non-aqueous solvents include ethylene carbonate, dimethyl carbonate, etc. As the positive electrode active material, lithium-containing transition metal oxides such as lithium cobalt oxide ($LiCoO_2$) are used. The negative electrode active material comprises a material capable of reversibly absorbing and desorbing lithium ions. For example, carbon materials such as graphite are used.

Non-aqueous electrolyte batteries have the advantage of capable of being charged to a higher voltage and having higher energy density. Due to high voltage and high energy density, the non-aqueous electrolyte is often decomposed by oxidation on the positive electrode. On the negative electrode, on the other hand, the non-aqueous electrolyte is often decomposed by reduction because the negative electrode has a very low electrochemical potential. These decomposition reactions tend to occur more readily at high temperatures, and a large amount of gas is generated when the battery is stored at a high temperature of 60 or 85° C.

The non-aqueous electrolyte battery is used as a power source for driving electronic devices such as notebook computers. The temperature inside a notebook computer is usually 45 to 60° C. Under such temperature conditions, the battery is charged at a constant voltage of 4.2 V, and the battery in a charged state is sometimes left for a while. When the battery in such a charged state is stored at high temperatures as just described, gas is more likely to be generated inside the battery as compared to when the battery in an open circuit condition is stored at high temperatures. As a result, the generation of gas during high temperature storage causes an increase in pressure inside the battery. This activates a protection circuit of the battery which shuts down the current, and the battery loses its function as a battery.

Because non-aqueous electrolytes have the problem that the non-aqueous solvent is easily decomposed and gas is easily generated during high temperature storage. In order to cope with this, proposals are made to add an imide salt or a phosphoric acid ester to a non-aqueous electrolyte.

There is proposed a battery in which a quaternary salt of a compound having an asymmetric chemical structure having a conjugated structure containing nitrogen is further incorporated into a non-aqueous electrolyte solution comprising a supporting electrolyte dissolved in a non-aqueous solvent (Patent Document 1). Also proposed is a battery whose non-aqueous electrolyte solution comprises a supporting electrolyte containing lithium ions as cations dissolved in a non-aqueous solvent comprising a cyclic compound to which a surfactant is further added. As an example of the cyclic compound, a cyclic phosphoric acid ester is proposed. As an example of the supporting electrolyte, an imide salt is proposed (Patent Document 2).

Patent Document 1: Japanese Patent No. 3060107
Patent Document 2: Japanese Laid-Open Patent Publication No. 2002-33119.

DISCLOSURE OF THE INVENTION

Problem to be Solved by the Invention

Patent Document 1 discloses a sulfonyl imide anion as an anion of the quaternary salt, and imidazolium salt as the compound having a conjugated structure containing nitrogen. By incorporating them into a non-aqueous electrolyte solution, the flame resistance of the non-aqueous electrolyte is improved. The weight ratio of quaternary salt to supporting electrolyte is 60/40 to 99/1. In other words, the amount of quaternary salt is larger. When the amount of quaternary salt is large, the corrosion of the surface of aluminum metal parts of the battery cannot be prevented. Because of this, the discharge capacity after high temperature storage lowers, and the capacity recovery rate after storage becomes low.

Imide salt, when used as a supporting electrolyte of the non-aqueous electrolyte, is known to corrode the aluminum metal parts inside the battery. In order to prevent the corrosion, Patent Document 2 proposes to add a cyclic phosphoric acid ester. The cyclic phosphoric acid ester decomposes and forms a coating on the surface of aluminum metal parts of the battery, whereby the corrosion by imide salt is prevented. However, the phosphoric acid is difficult to decompose because it is a cyclic compound. Accordingly, the corrosion by imide salt proceeds before the decomposition products form a protection coating on the surface of aluminum metal parts of the battery.

The present invention has been made to solve the above-described problems encountered in conventional non-aqueous electrolyte secondary batteries. It is an object of the present invention to provide a non-aqueous electrolyte secondary battery that generates less amount of gas during high temperature storage and prevents the corrosion of the battery parts even when they are made of aluminum metal.

Means for Solving the Problem

The non-aqueous electrolyte secondary battery of the present invention is a non-aqueous electrolyte secondary battery comprising a positive electrode plate, a negative electrode plate, and a non-aqueous electrolyte comprising a non-aqueous solvent and a solute dissolved in the non-aqueous solvent, wherein the non-aqueous electrolyte further comprises a chain phosphoric acid ester and at least one imide salt represented by the formula (1),

[Chemical formula 1]

where $R^1$ and $R^2$ each independently represent $C_nX_{2n+1}$, X represents a hydrogen atom or halogen atom, and n is an integer equal to or greater than 1, and the amount of the chain phosphoric acid ester is 50 to 20000 ppm relative to the total weight of the non-aqueous electrolyte.

Effect of the Invention

By adding an imide salt and a chain phosphoric acid ester to a non-aqueous electrolyte, the battery parts are not corroded even when they are made of aluminum metal, and the generation of gas during high temperature storage can be suppressed. Accordingly, a highly reliable non-aqueous electrolyte secondary battery can be provided.

BEST MODE FOR CARRYING OUT THE INVENTION

The non-aqueous electrolyte secondary battery of the present invention is a non-aqueous electrolyte secondary battery comprising a positive electrode plate, a negative electrode plate, and a non-aqueous electrolyte comprising a non-aqueous solvent and a solute dissolved in the non-aqueous solvent, wherein the non-aqueous electrolyte further comprises a chain phosphoric acid ester and at least one imide salt represented by the above formula (1), and the amount of the chain phosphoric acid ester is 50 to 20000 ppm relative to the total weight of the non-aqueous electrolyte.

Non-aqueous electrolyte secondary batteries usually further comprise an isolation means for isolating the positive and negative electrodes from each other. The isolation means can be a separator and/or a solid electrolyte.

Examples of the imide anion represented by the above formula (1) include $[N(CF_3SO_2)_2]^-$, $[N(C_2F_5SO_2)_2]^-$, $[N(CF_3CH_2SO_2)_2]^-$, $[N(CF_3SO_2)(C_4F_9SO_2)]^-$ and $[N(CF_3SO_2)(C_6F_{13}SO_2)]^-$.

In the above formula (1), n is preferably 1 to 8, and more preferably 1 to 6. When n exceeds 6, the effect of suppressing the generation of gas during high temperature storage is reduced by half.

Since the effect of the present invention is derived from the imide anion represented by the formula (1), the type of cation is not specifically limited. Preferred examples of the cation for forming an imide salt with the imide anion include: ions of an alkali metal such as Li, Na and K; ions of an alkaline-earth metal such as Mg, Ca and Sr; aluminum ions; imidazolium ions; ammonium ions; phosphonium ions; and sulfonium ions.

The chain phosphoric acid ester is preferably at least one chain phosphoric acid ester represented by the formula (2),

[Chemical formula 2]

where $R^3$, $R^4$ and $R^5$ each independently represent $C_mY_{2m+1}$, $C_mY_{2m}$, $C_6H_5$ or $C_mY_{2m+1}$—$C_6H_4$, Y represents a hydrogen atom or halogen atom, and m is an integer from 1 to 8.

Examples of the chain phosphoric acid ester include trimethyl phosphate, tri-n-butyl phosphate, trioctyl phosphate, tris(2-ethylhexyl)phosphate, triphenyl phosphate, diethyl methyl phosphate, dibutyl methyl phosphate, trifluoroethyldimethyl phosphate, tris(trifluoromethyl) phosphate, tris(chloroethyl)phosphate, tris(tribromoneopentyl)phosphate, dimethylmethyl phosphate, tris(dichloropropyl)phosphate, tris(2,6-dimethylphenyl) phosphate, diethyl propyl phosphate, tris(trifluoroethyl) phosphate and dipropyl ethyl phosphate.

According to a preferred embodiment of the present invention, in the imide anion represented by the formula (1), $R^1$ and $R^2$ independently represent $C_nX_{2n-1}$, where n is 1 to 6. When n is greater than 8, the corrosion of the surface of aluminum metal parts of the battery by the imide anion cannot be prevented, failing to obtain the prevention effect.

The present inventors found that, by adding the imide salt and the chain phosphoric acid ester to a non-aqueous electrolyte, it is possible to suppress the generation of gas caused by the decomposition of non-aqueous solvent during high temperature storage as well as to prevent the corrosion of aluminum metal parts. The reason why the addition of the imide salt to a non-aqueous electrolyte produces the effect of suppressing the generation of gas during high temperature storage is not clearly known. However, considering the fact that the amounts of both gases generated at the positive and negative electrodes are reduced, it can be assumed that the gas generation at the interface between the surface of the positive electrode active material and the non-aqueous electrolyte and the gas generation at the interface between the surface of the negative electrode active material and the non-aqueous electrolyte are suppressed.

Data for supporting the above assumption have been obtained, which is described below.

The oxidation potential was measured at room temperature by an electrochemical technique, namely, cyclic voltammetry using a platinum electrode as the working electrode, and lithium metal as the counter electrode and the reference electrode. As a result, in the case of the imide anion being $[N(CF_3SO_2)_2]^-$, the peak current appeared at about a potential of 4.2 V (vs. Li/Li$^+$). In other words, a current that indicates the decomposition by oxidation was observed. When a lithium ion secondary battery has a battery voltage of 4.2 V, the potential of the positive electrode active material is 4.2 V (vs. Li/Li$^+$) or higher. Accordingly, the lithium imide salt incorporated into the non-aqueous electrolyte is decomposed during the initial charge. The products produced by the decomposition cover the surface of the positive electrode active material, that is, the active sites where the positive electrode active material reacts with the non-aqueous electrolyte are covered. As a result, the generation of gas during charge is suppressed. Further, the decomposition products also cover the surface of the negative electrode active material, and therefore the generation of gas on the surface of the negative electrode active material is also suppressed.

Imide anions have the following disadvantages.

When imide anions come in contact with metallic aluminum having a high potential at high temperatures, they corrode the metallic aluminum. In lithium ion secondary batteries, the positive electrode current collector, the positive electrode lead and the outer case are made of metallic aluminum. When the positive electrode current collector and the positive electrode lead are corroded, their electron conductivity lowers, degrading the battery performance. In the case where the non-aqueous electrolyte is a liquid, the aluminum case is corroded. When the corrosion proceeds, the non-aqueous electrolyte solution contained in the case leaks out from the battery. As just described, imide anions have the disadvantage that they corrode the aluminum metal parts of batteries.

In the present invention, a chain phosphoric acid ester, which decomposes more easily than a cyclic phosphoric acid ester, is added to a non-aqueous electrolyte. Because the chain phosphoric acid ester decomposes and forms a coating for protecting aluminum metal parts on the surface of the aluminum metal part of the battery, the corrosion of aluminum by the imide anion can be prevented. When the ratio of the chain phosphoric acid ester is less than 50 ppm, the protection film sufficient to prevent the corrosion of aluminum is not formed. Conversely, when the ratio exceeds 20000 ppm, because of the decomposition products, the performance after storage degrades significantly.

According to a preferred embodiment of the present invention, the concentration of the imide salt contained in the non-aqueous electrolyte is 0.01 to 0.5 mol/L.

When the concentration of the imide salt is less than 0.01 mol/L, the effect of suppressing the generation of gas during high temperature storage cannot be obtained. When the concentration of the imide salt is greater than 0.5 mol/L, as described previously, the corrosion of aluminum metal parts occurs more easily.

According to further preferred embodiment of the present invention, the concentration of the imide salt contained in the non-aqueous electrolyte is equal to or less than the concentration of other supporting electrolyte (solute) described below in terms of mol/L.

When the concentration of the imide salt is greater than that of other supporting electrolyte, the influence of the imide anion becomes strong. As a result, as discussed previously, the corrosion of aluminum metal parts occurs more easily.

The non-aqueous electrolyte in a liquid form comprises a non-aqueous solvent and a supporting electrolyte (solute) dissolved in the solvent.

The solute comprises at least one of conventionally used alkali metal salts. Preferred examples include: fluorine-containing inorganic anion salts such as $LiPF_6$, $LiBF_4$, $LiAsF_6$, $LiSbF_6$, $NaPF_6$ and $NaBF_4$; and lithium methide salts such as $LiC(CF_3SO_2)_3$ and $LiC(C_2F_5SO_2)_3$. The fluorine-containing inorganic anion salts are particularly preferred because they are highly resistant to corrosion.

As for the non-aqueous solvent, examples include: cyclic carbonic acid esters such as propylene carbonate, ethylene carbonate, butylene carbonate and vinylene carbonate; non-cyclic carbonic acid esters such as dimethyl carbonate, diethyl carbonate and methyl ethyl carbonate; lactones and their derivatives such as γ-butyrolactone, γ-valerolactone and δ-valerolactone; furans and their derivatives such as tetrahydrofuran and 2-methyltetrahydrofuran; ethers and their derivatives such as 1,2-dimethoxyethane and 1,2-diethoxyethane; glymes and their derivatives such as diglyme, triglyme and tetraglyme; amides such as N,N-dimethylformamide and N-methylpyrrolidinone; alcohols such as ethylene glycol and propylene glycol; esters such as methyl acetate, ethyl acetate, methyl propionate and ethyl propionate; dimethyl sulfoxide; sulfolane and its derivative; dioxolane and its derivative. Preferably, the non-aqueous solvent comprises at least one of those listed above.

The non-aqueous solvent may further comprise an additive that has conventionally been used, such as cyclohexylbenzene or vinylene carbonate. The effect of the present invention becomes more pronounced when the non-aqueous solvent comprises dimethyl carbonate and ethyl methyl carbonate which easily cause an ester exchange reaction.

A preferred non-aqueous solvent is a mixture of a ring-closed compound and a straight-chain compound capable of transesterification. This mixture, when used as the non-aqueous solvent, reduces the viscosity of the resulting electrolyte solution, improves the permeability and increases the solubility of solutes.

The separator serving as an isolation means for isolating the positive and negative electrodes from each other is not specifically limited. Preferably, a microporous film made of polyethylene or polypropylene is preferred.

As the non-aqueous electrolyte, so-called polymer gel electrolyte, a polymer electrolyte containing a non-aqueous electrolyte solution, can be used. The polymer electrolyte can be obtained by impregnating a polymer electrolyte with a non-aqueous electrolyte solution containing an imide anion compound and a chain phosphoric acid ester, or by mixing a monomer solution with a non-aqueous electrolyte solution containing a bromine compound, followed by polymerization. Such solid electrolytes can be used as the isolation means for isolating the positive and negative electrodes from each other.

The positive electrode active material is not specifically limited. Examples include: lithium cobalt oxide ($LiCoO_2$); lithium nickel oxide ($LiNiO_2$); lithium manganese oxide ($LiMn_2O_4$, $LiMnO_2$); lithium iron oxide ($LiFeO_2$); active materials obtained by partially replacing the transition metal (e.g., Co, Ni, Mn or Fe) of the above-listed compounds with other transition metal (e.g., tin or aluminum); lithium compounds having an olivine structure such as lithium iron phosphate ($LiFePO_4$), lithium manganese phosphate ($LiMnPO_4$) and lithium cobalt phosphate ($LiCoPO_4$); transition metal oxides such as vanadium oxide ($V_2O_5$), manganese dioxide ($MnO_2$) and molybdenum oxide ($MoO_2$); transition metal sulfides such as iron sulfate ($FeSO_4$), titanium sulfide ($TiS_2$), molybdenum sulfide ($MoS_2$, $MoS_3$) and iron sulfide ($FeS_2$); and polymers such as polyaniline, polypyrrole and polythiophene.

When the present invention is applied to a non-aqueous electrolyte secondary battery such as a lithium ion secondary battery including an aluminum foil as the current collector of the positive electrode plate, as is normally the case, significant effect is obtained by using a positive electrode active material having a potential of 3.8 V or higher relative to lithium metal when it is charged. Examples of the active material having a potential of 3.8 V or higher relative to lithium metal when it is charged include: lithium compounds having an olivine structure such as lithium cobalt oxide ($LiCoO_2$), lithium nickel oxide ($LiNiO_2$), lithium manganese oxide (LiMn$_2$O$_4$, LiMnO$_2$), lithium manganese phosphate (LiMnPO$_4$) and lithium cobalt phosphate (LiCoPO$_4$); materials comprising the above-listed compound in which an alkaline-earth metal or transition metal is included to form a solid solution; and materials obtained by replacing the metal element of the above-listed compound with an alkaline-earth metal or transition metal.

The negative electrode active material is not specifically limited. For example, as host materials for an alkaline metal ion such as lithium ion or sodium ion, carbon materials such as amorphous carbon material, artificial graphite and natural graphite are used. As materials capable of allying with an alkali metal, there can be used metals such as aluminum (Al), lead (Pb), tin (Sn), bismuth (Bi) and silicon (Si); oxides of lead; oxides of tin; oxides of bismuth; oxides of silicon; cubic system intermetallic compounds which intercalate an alkali metal between the lattices thereof (AlSb, Mg$_2$Si and NiSi$_2$); lithium nitride compounds represented by the general formula: Li$_{(3-x)}$M$_x$N, where M represents a transition metal; and $0.2 \leq x \leq 0.6$; a titanium spinel compound (Li$_4$Ti$_5$O$_{12}$); and lithium vanadium oxides.

An example of the present invention is described below in relation to a cylindrical lithium ion secondary battery.

Figure 1:
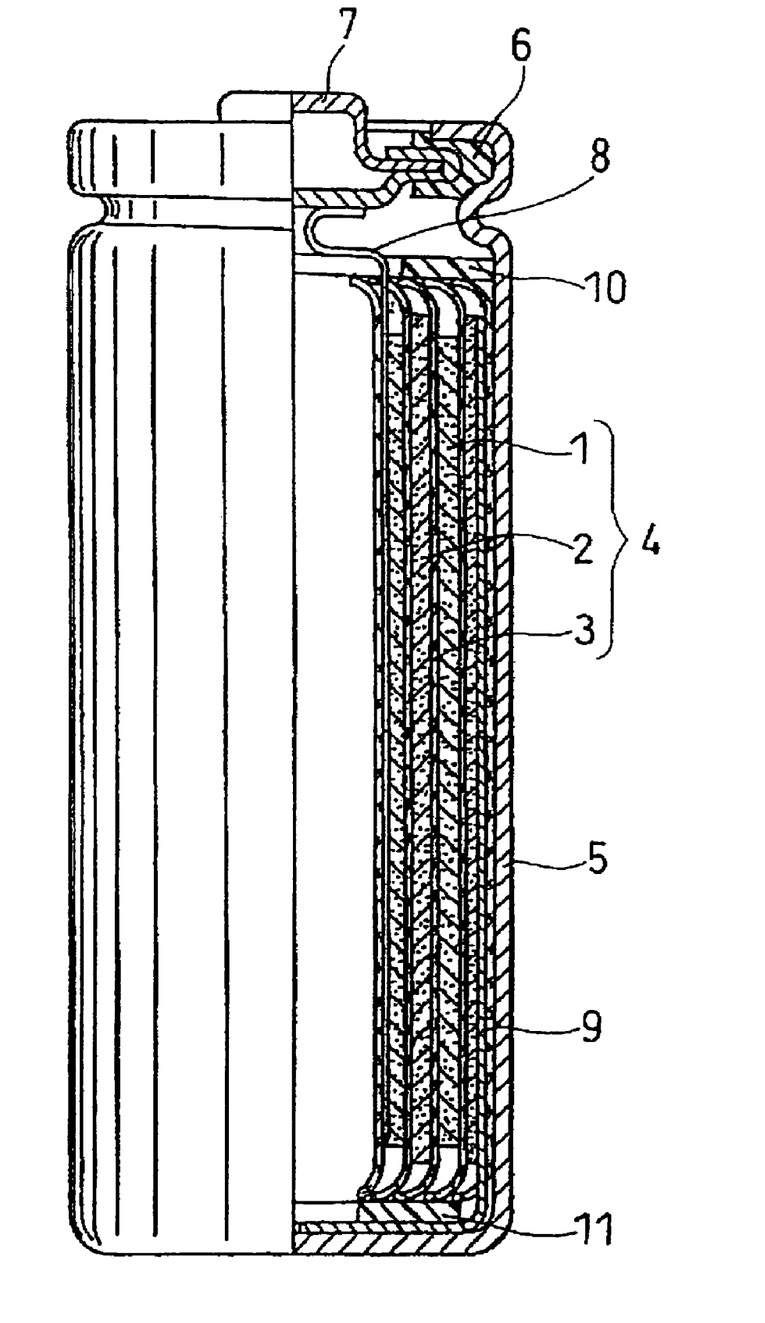
FIG. 1 is a front view, partially in cross section, of a cylindrical lithium ion secondary battery in accordance with the present invention.

FIG. 1 is a front view of a cylindrical lithium ion secondary battery with its relevant part shown in cross section. A strip-shaped positive electrode plate 1, a strip-shaped negative electrode plate 2 and a separator 3 for isolating the positive electrode plate 1 and the negative electrode plate 2 from each other are spirally wound to form an electrode assembly 4. This electrode assembly 4 is housed in a battery can 5 with a non-aqueous electrolyte solution. The positive electrode plate 1 comprises an aluminum foil current collector (not shown) and a positive electrode material mixture layer applied onto the current collector. The negative electrode 2 comprises a copper foil current collector (not shown) and a negative electrode material mixture layer applied onto the current collector. The separator 3 comprises a microporous polyethylene film having a thickness of 25 μm. This battery has a size of 18 mm in diameter and 65 mm in height, a nominal voltage of 3.6 V and a nominal capacity of 1600 mAh.

The opening of the battery can 5 is sealed with a battery lid 7 with the edge of the opening crimping onto the periphery of the battery lid with a polypropylene insulating packing 6 therebetween. An aluminum positive electrode lead 8 whose one end is welded to the current collector of the positive electrode plate is connected to the battery lid 7 by means of welding. A nickel negative electrode lead 9 whose one end is welded to the current collector of the negative electrode plate 2 is connected to the battery can 5 by means of welding. On the top of the electrode assembly 4 is placed an upper insulating ring 10 for insulating the electrode assembly from the battery lid 7. On the bottom of the electrode assembly 4 is placed a lower insulating ring 11 for insulating the electrode assembly from the battery can 5. In this battery, the battery can serves as the negative electrode terminal, and the battery lid serves as the positive electrode terminal.

Methods for producing the positive electrode plate 1 and the negative electrode plate 2 are described below.

A mixture prepared by mixing Li$_2$CO$_3$, CO$_3$O$_4$ and MgCO$_3$ at a molar ratio Li:Co:Mg of 1:0.97:0.03 is baked at 900° C. for 10 hours to obtain a composite oxide: LiMg$_{0.03}$Co$_{0.97}$O$_{2-a}$, where "a" satisfies $0 \leq a \leq 1$. With 100 parts by weight of powders of this composite oxide are mixed 3 parts by weight of acetylene black serving as a conductive material and 7 parts by weight of polytetrafluoroethylene serving as a binder, which is then suspended in an aqueous solution of carboxymethyl cellulose to form a paste. This paste is applied onto both surfaces of an aluminum foil having a thickness of 30 μm, followed by drying and rolling. Thereby, the positive electrode plate 1 having a thickness of 0.18 mm is produced.

With 100 parts by weight of powders of artificial graphite are mixed 5 parts by weight (solid content) of an aqueous dispersion of styrene-butadiene copolymer serving as a binder (BM-400B manufactured by Zeon Corporation, Japan), which is then suspended in an aqueous solution of carboxymethyl cellulose to form a paste. This paste is applied onto both surfaces of a copper foil having a thickness of 20 μm, followed by drying and rolling. Thereby, the negative electrode plate 2 having a thickness of 0.19 mm is produced.

The non-aqueous electrolyte is prepared by dissolving lithium hexafluorophosphate (LiPF$_6$) serving as a solute in a solvent mixture of ethylene carbonate, ethyl methyl carbonate and diethyl carbonate at a volume ratio of 1:2:1 at a LiPF$_6$ concentration of 1.0 mol/L. Hereinafter, this electrolyte is referred to as a reference electrolyte solution.

The battery produced in the above-described manner is subjected to charge/discharge cycles as described below. Thereby, a finished battery is obtained.

(1) At an ambient temperature of 25° C., the battery is charged at a constant current of 320 mA (equal to 0.2 C) until the voltage reaches 4.1 V, and then discharged at a constant current of 320 mA until the voltage reaches 3.0 V. This cycle is repeated three times.

(2) At an ambient temperature of 25° C., the battery is again charged at a constant current of 320 mA until the voltage reaches 4.1 V, and then is allowed to stand at 60° C. for two days.

The following describes the imide salt and chain phosphoric acid ester added to the non-aqueous electrolyte solution in detail.

EXAMPLES 1 TO 7

In the following examples, investigations were made on the combinations of the imide salt and the chain phosphoric acid ester.

Non-aqueous electrolyte solutions were prepared by adding, to the reference electrolyte solution prepared above, 100 ppm of triethyl phosphate as the phosphoric acid ester and lithium bis(trifluoromethansulfonyl)imide represented by [N(CF$_3$SO$_2$)]$_2$Li in an amount shown in Table 1. Using the non-aqueous electrolyte solutions, batteries of Examples 1 to 7 were produced.

COMPARATIVE EXAMPLES 1 TO 10

A battery of Comparative Example 1 was produced in the same manner as in Example 1 except that an electrolyte solution prepared by adding 100 ppm of triethyl phosphate to the reference electrolyte solution was used.

Non-aqueous electrolyte solutions were prepared by adding lithium bis(trifluoromethansulfonyl)imide in an amount shown in Table 1 to the reference electrolyte solution. Using these non-aqueous electrolyte solutions, batteries of Comparative Examples 2 to 9 were produced.

Also, a battery of Comparative Example 10 was produced without the addition of the phosphoric acid ester and the imide salt to the reference electrolyte solution.

TABLE 1

|  | Imide salt concentration (mol/L) | Amount of phosphoric acid ester (ppm) |
|---|---|---|
| Ex. 1 | 0.01 | 100 |
| Ex. 2 | 0.03 | 100 |
| Ex. 3 | 0.05 | 100 |
| Ex. 4 | 0.10 | 100 |
| Ex. 5 | 0.30 | 100 |
| Ex. 6 | 0.50 | 100 |
| Ex. 7 | 0.75 | 100 |
| Comp. Ex. 1 | 0 | 100 |
| Comp. Ex. 2 | 0.005 | 0 |
| Comp. Ex. 3 | 0.01 | 0 |
| Comp. Ex. 4 | 0.03 | 0 |
| Comp. Ex. 5 | 0.05 | 0 |
| Comp. Ex. 6 | 0.10 | 0 |
| Comp. Ex. 7 | 0.30 | 0 |
| Comp. Ex. 8 | 0.50 | 0 |
| Comp. Ex. 9 | 0.75 | 0 |
| Comp. Ex. 10 | 0 | 0 |

Imide salt: lithium bis(trifluoromethansulfonyl)imide
Phosphoric acid ester: triethyl phosphate The batteries of Examples 1 to 7 and Comparative Examples 1 to 10 in a charged state, ten of each, were subjected to a high temperature storage test. Five out of ten batteries were used to measure the amount of gas generated during storage, and the remaining five were used to measure the discharge capacities before storage and after storage.

The storage test was a test in which each battery charged to 4.25 V by the following charge/discharge cycles (1) and charge (2) was stored at an ambient temperature of 60° C. for 20 days.

(1) The following charge/discharge cycle was repeated three times.

Charge: each battery was charged at a constant current of 1120 mA (equal to 0.7 C) until the voltage reached 4.2 V. After the voltage reached 4.2 V, the battery was charged at a constant voltage of 4.2 V. The total charge time (including the constant current charge time and the constant voltage charge time) was 2.5 hours.

Discharge: the battery was discharged at a constant current of 800 mA (equal to 0.5 C) until the voltage reached 2.5 V.

(2) At an ambient temperature of 25° C., the battery was charged at a constant current of 1120 mA until the voltage reached 4.25 V. After the voltage reached 4.25 V, the battery was charged at a constant voltage of 4.25 V for 2.5 hours.

The amount of gas generated inside the battery that was subjected to the above storage test was measured as follows.

Each battery after storage and a drawing pin were placed in a bag made of Teflon (registered trademark). The bag was filled with a known amount of argon gas, which was then sealed. Using the drawing pin in the bag, a hole was made in the sealing plate of the battery in the bag. Gas from the battery was collected in the bag. The amount of the collected gas was determined by gas chromatography.

The battery capacities before and after storage were measured as follows.

Before and after the storage test, each battery was discharged as described in (i) below to discharge the remaining capacity, and then subjected to three charge/discharge cycles as described in (ii) below. Subsequently, the discharge capacity at the third cycle was measured.

(i) Each battery was discharged at a constant current of 800 mA (equal to 0.5 C) until the voltage reached 2.5 V.

(ii) Charge: the battery was charged at a constant current of 1120 mA (equal to 0.7 C) until the voltage reached 4.2 V. After the voltage reached 4.2 V, the battery was charged at a constant voltage of 4.2 V for 2.5 hours.

Discharge: the battery was discharged in the same manner as in (i) above.

In the above-described manner, the discharge capacity (C1) at the third cycle before storage and the discharge capacity (C2) at the third cycle after storage were measured. Subsequently, the capacity recovery rate after storage (100×C2/C1) was calculated. Table 2 shows the discharge capacities before and after storage, the recovery rate and the amount of gas generated during storage.

TABLE 2

|  | Discharge capacity (mAh) | | Recovery rate (%) | Gas amount (ml) |
|---|---|---|---|---|
|  | Before storage | After storage |  |  |
| Ex. 1 | 1600 | 1306 | 81.6 | 9.4 |
| Ex. 2 | 1600 | 1315 | 82.2 | 8.1 |
| Ex. 3 | 1600 | 1339 | 83.7 | 7.2 |
| Ex. 4 | 1600 | 1350 | 84.4 | 6.0 |
| Ex. 5 | 1600 | 1344 | 84.0 | 5.8 |
| Ex. 6 | 1600 | 1318 | 82.4 | 6.4 |
| Ex. 7 | 1600 | 1314 | 82.1 | 6.7 |
| Comp. Ex. 1 | 1600 | 1192 | 74.5 | 18.4 |
| Comp. Ex. 2 | 1600 | 1229 | 76.8 | 9.9 |
| Comp. Ex. 3 | 1600 | 1240 | 77.5 | 8.5 |
| Comp. Ex. 4 | 1600 | 1253 | 78.3 | 7.7 |
| Comp. Ex. 5 | 1600 | 1256 | 78.5 | 6.6 |
| Comp. Ex. 6 | 1600 | 1270 | 79.4 | 6.7 |
| Comp. Ex. 7 | 1600 | 1264 | 79.0 | 6.9 |
| Comp. Ex. 8 | 1600 | 1258 | 78.6 | 7.3 |
| Comp. Ex. 9 | 1600 | 1243 | 77.7 | 9.0 |
| Comp. Ex. 10 | 1600 | 1171 | 73.2 | 18.5 |

From Table 2, it is clear that the batteries of Examples 1 to 7 exhibited better discharge capacity after storage and higher recovery rate than the batteries of Comparative Examples 1 to 10. Among the batteries of Comparative Examples, in the battery of Comparative Example 1 containing only the chain phosphoric acid ester, the amount of gas generated during storage was large. Likewise, in the battery of Comparative Example 10 without the imide salt and the chain phosphoric acid ester, the amount of gas generated during storage was large.

Comparisons between the batteries of Examples 1 to 7 containing the imide salt and the chain phosphoric acid ester and the batteries of Comparative Examples 2 to 6 containing only the imide salt clearly indicate that, although they were similar in terms of amount of generated gas, the batteries of the present invention were better in terms of discharge capacity after storage. However, as can be clearly seen from the comparison between Examples 6 and 7, even when the concentration of imide salt was increased to 0.75 mol/L, no significant improvement was observed in discharge capacity after storage.

From the foregoing, it can be concluded that the concentration of the imide salt is preferably 0.01 to 0.5 mol/L. Presumably, another factor other than the addition of the imide salt is involved. Although the present inventors do not wish to be bound by any particular theory, they believe as follows. In the case of Example 7, the total concentration of the imide salt and other solute ($LiPF_6$ in this example) was 1.75 mol/L, and the resulting electrolyte solution was highly concentrated. As a result, the discharge capacity after storage was not improved. However, the reason why the discharge capacity after storage does not improve when the electrolyte solution has a high concentration is not clearly known.

EXAMPLES 8 AND 9

Non-aqueous electrolyte solutions were prepared in the same manner as in Example 1 except that the concentrations of supporting electrolytes, that is, the concentration of $LiPF_6$ and the concentration of lithium bis(trifluoromethansulfonyl)imide as the imide salt were changed to those listed in Table 3. Specifically, the amount of triethyl phosphate as the chain phosphoric acid ester was 100 ppm, and the total amount of Li in the non-aqueous electrolyte solution derived from $LiPF_6$ and lithium bis(trifluoromethansulfonyl)imide was 0.8 mol/L. Batteries of Examples 8 and 9 were produced in the same manner as in Example 1 except for the above.

COMPARATIVE EXAMPLE 11

Similar to Examples 8 and 9, the amount of triethyl phosphate was 100 ppm, and the total amount of Li in the non-aqueous electrolyte solution derived from $LiPF_6$ and lithium bis(trifluoromethansulfonyl)imide was 0.8 mol/L. A non-aqueous electrolyte solution containing a larger amount of imide salt than that of $LiPF_6$ and than the amount of imide salt of Examples 8 and 9 was prepared. A battery of Comparative Example 11 was produced in the same manner as in Example 1 except for the above.

EXAMPLES 10 AND 11

Non-aqueous electrolyte solutions were prepared in the same manner as in Example 1 except that the concentrations of supporting electrolytes, that is, the concentration of $LiPF_6$ and the concentration of ethyl methyl imidazolium bis(trifluoromethansulfonyl)imide as the imide salt were changed to those listed in Table 3. Specifically, the amount of triethyl phosphate as the chain phosphoric acid ester was 100 ppm, and the total amount of Li in the non-aqueous electrolyte solution was 0.5 mol/L. Batteries of Examples 10 and 11 were produced in the same manner as in Example 1 except for the above.

COMPARATIVE EXAMPLE 12

Similar to Examples 10 and 11, the amount of triethyl phosphate was 100 ppm, and the total amount of Li in the non-aqueous electrolyte solution was 0.5 mol/L. A non-aqueous electrolyte solution containing a larger amount of imide salt than that of Examples 10 and 11 was prepared. A battery of Comparative Example 12 was produced in the same manner as in Example 1 except for the above.

TABLE 3

| | Imide salt | Imide salt concentration (mol/L) | $LiPF_6$ concentration (mol/L) |
|---|---|---|---|
| Ex. 8 | Lithium bis(trifluoromethansulfonyl)imide | 0.3 | 0.5 |
| Ex. 9 | Lithium bis(trifluoromethansulfonyl)imide | 0.4 | 0.4 |
| Comp. Ex. 11 | Lithium bis(trifluoromethansulfonyl)imide | 0.5 | 0.3 |
| Ex. 10 | Ethyl methyl imidazolium bis(trifluoromethansulfonyl)imide | 0.3 | 0.5 |
| Ex. 11 | Ethyl methyl imidazolium bis(trifluoromethansulfonyl)imide | 0.5 | 0.5 |
| Comp. Ex. 12 | Ethyl methyl imidazolium bis(trifluoromethansulfonyl)imide | 0.75 | 0.5 |

The batteries of Examples 8 to 11 and Comparative Examples 11 and 12 were evaluated in the same manner as in Example 1. The results are shown in Table 4.

TABLE 4

| | Discharge capacity (mAh) | | Recovery rate (%) | Gas amount (ml) |
|---|---|---|---|---|
| | Before storage | After storage | | |
| Ex. 8 | 1600 | 1317 | 82.4 | 6.1 |
| Ex. 9 | 1600 | 1312 | 82.1 | 6.5 |
| Comp. Ex. 11 | 1600 | 1241 | 77.6 | 7.8 |
| Ex. 10 | 1600 | 1297 | 81.1 | 7.1 |
| Ex. 11 | 1600 | 1290 | 80.7 | 7.3 |
| Comp. Ex. 12 | 1600 | 1239 | 77.4 | 7.6 |

From Table 4, it is clear that the batteries of Examples 8 to 11 in which the concentration of imide salt was lower than that of other supporting electrolyte exhibited a larger discharge capacity after storage than the batteries of Comparative Examples 11 and 12 in which the concentration of imide salt was higher than that of other supporting electrolyte. When the amount of imide salt was larger than that of other supporting electrolyte, the corrosion of the aluminum foil serving as the current collector of the positive electrode plate was observed. Presumably, this caused such a low discharge capacity after storage.

EXAMPLES 12 TO 17

Investigations were made on the number of carbon atoms contained in the imide salt.

Non-aqueous electrolyte solutions were prepared by mixing the reference electrolyte solution prepared above with the imide salt listed in Table 5 and triethyl phosphate serving as the chain phosphoric acid ester. Batteries of Examples 12 to 17 were produced in the same manner as in Example 1 except that these non-aqueous electrolyte solutions were used.

TABLE 5

| | Imide salt | Imide salt concentration (mol/L) | Amount of triethyl phosphate (ppm) |
|---|---|---|---|
| Ex. 12 | $(CF_3SO_2)_2NLi$ | 0.1 | 100 |
| Ex. 13 | $(CF_3SO_2)(C_4F_9SO_2)NLi$ | 0.1 | 100 |
| Ex. 14 | $(CF_3SO_2)(C_6F_{13}SO_2)NLi$ | 0.1 | 100 |
| Ex. 15 | $(CF_3SO_2)(C_6F_{13}SO_2)NLi$ | 0.1 | 500 |
| Ex. 16 | $(CF_3SO_2)(C_8F_{17}SO_2)NLi$ | 0.1 | 100 |
| Ex. 17 | $(CF_3SO_2)(C_8F_{17}SO_2)NLi$ | 0.1 | 1000 |

The batteries of Examples 12 to 17 were evaluated in the same manner as in Example 1. The results are shown in Table 6.

TABLE 6

| | Discharge capacity (mAh) | | Recovery rate (%) | Gas amount (ml) |
|---|---|---|---|---|
| | Before storage | After storage | | |
| Ex. 12 | 1600 | 1350 | 84.4 | 6.0 |
| Ex. 13 | 1600 | 1338 | 83.7 | 6.3 |
| Ex. 14 | 1600 | 1336 | 83.5 | 6.2 |
| Ex. 15 | 1600 | 1328 | 83.0 | 6.4 |
| Ex. 16 | 1600 | 1330 | 83.1 | 6.5 |
| Ex. 17 | 1600 | 1309 | 81.8 | 6.8 |

From Table 6, it is clear that the batteries of Examples 12 to 14 exhibited better discharge capacity after storage, higher recovery rate and less amount of gas generated during storage than the battery of Example 16. This result indicates that the number of carbon atoms (n) contained in the imide salt represented by the formula (1) is preferably 1 to 6.

EXAMPLES 18 TO 24

In these examples, investigations were made on the amount of the chain phosphoric acid ester.

Non-aqueous electrolyte solutions were prepared by mixing the reference electrolyte solution prepared above with lithium bis(trifluoromethansulfonyl)imide serving as the imide salt and triethyl phosphate serving as the chain phosphoric acid ester at concentrations shown in Table 7 (with the concentrations of the imide salt held constant). Batteries of Examples 18 to 24 were produced in the same manner as in Example 1 except that these electrolyte solutions were used.

COMPARATIVE EXAMPLES 13 TO 15

Electrolyte solutions were prepared in the same manner as in Example 1 except that the concentrations of the imide salt and the concentrations of the phosphoric acid ester were changed to those listed in Table 7 (with the concentrations of the imide salt held constant). Batteries of Comparative Examples 13 to 15 were produced using these electrolyte solutions.

TABLE 7

| | Imide salt concentration (mol/L) | Amount of phosphoric acid ester (ppm) |
|---|---|---|
| Comp. Ex. 13 | 0.1 | 10 |
| Ex. 18 | 0.1 | 50 |
| Ex. 19 | 0.1 | 100 |
| Ex. 20 | 0.1 | 500 |
| Ex. 21 | 0.1 | 1000 |
| Ex. 22 | 0.1 | 2000 |
| Ex. 23 | 0.1 | 5000 |
| Ex. 24 | 0.1 | 20000 |
| Comp. Ex. 14 | 0.1 | 50000 |
| Comp. Ex. 15 | 0.1 | 0 |

Imide salt: lithium bis(trifluoromethansulfonyl)imide
Phosphoric acid ester: triethyl phosphate The batteries of Examples 18 to 24 and Comparative Examples 13 and 15 were evaluated in the same manner as in Example 1. The results are shown in Table 8.

TABLE 8

| | Discharge capacity (mAh) | | Recovery rate (%) | Gas amount (ml) |
|---|---|---|---|---|
| | Before storage | After storage | | |
| Comp. Ex. 13 | 1600 | 1312 | 82.0 | 5.8 |
| Ex. 18 | 1600 | 1347 | 84.2 | 5.9 |
| Ex. 19 | 1600 | 1350 | 84.4 | 6.0 |
| Ex. 20 | 1600 | 1346 | 84.1 | 6.0 |
| Ex. 21 | 1600 | 1341 | 83.8 | 6.1 |
| Ex. 22 | 1600 | 1338 | 83.6 | 6.2 |
| Ex. 23 | 1600 | 1333 | 83.3 | 6.2 |
| Ex. 24 | 1600 | 1328 | 83.0 | 6.3 |
| Comp. Ex. 14 | 1600 | 1304 | 81.5 | 6.5 |
| Comp. Ex. 15 | 1600 | 1270 | 79.4 | 6.6 |

From Table 8, it is clear that the batteries of Examples 18 to 24 containing appropriate amounts of imide salt and chain phosphoric acid ester exhibited better discharge capacity after storage than the battery of Comparative Example 15 containing only imide salt. The battery of Comparative Example 13 containing an extremely small amount of chain phosphoric acid ester and the battery of Comparative Example 14 containing an extremely large amount of chain phosphoric acid ester exhibited small discharge capacity after storage and low recovery rate.

EXAMPLES 25 TO 29

In these examples, investigations were made on the number of carbon atoms contained in $R^3$ to $R^5$ of the chain phosphoric acid ester represented by the formula (2).

Non-aqueous electrolyte solutions were prepared by mixing the reference electrolyte solution prepared above with lithium bis(trifluoromethansulfonyl)imide serving as the imide salt and the chain phosphoric acid ester listed in Table 9 with the concentrations of the imide salt and the chain phosphoric acid ester held constant. Batteries of Examples 25 to 29 were produced in the same manner as in Example 1 except that these electrolyte solutions were used.

COMPARATIVE EXAMPLES 16 AND 17

Batteries of Comparative Examples 16 and 17 were produced in the same manner as in Example 25 except that the phosphoric acid ester was changed to those shown in Table 9.

TABLE 9

| | Imide salt concentration (mol/L) | Phosphoric acid ester | Amount of phosphoric acid ester (ppm) |
|---|---|---|---|
| Ex. 25 | 0.1 | Trimethyl phophate | 100 |
| Ex. 26 | 0.1 | Tri-n-butyl phophate | 100 |
| Ex. 27 | 0.1 | Trioctyl phosphate | 100 |
| Ex. 28 | 0.1 | Tris(2-ethylhexyl)phosphate | 100 |
| Ex. 29 | 0.1 | Triphenyl phosphate | 100 |
| Comp. Ex. 16 | 0.1 | Tris(2-butylhexyl)phosphate | 100 |
| Comp. Ex. 17 | 0.1 | Ethylene ethyl phosphate | 100 |

Imide salt: lithium bis(trifluoromethansulfonyl)imide

The batteries of Examples 25 to 29 and Comparative Examples 16 and 17 were evaluated in the same manner as in Example 1. The results are shown in Table 10.

TABLE 10

| | Discharge capacity (mAh) | | Recovery rate (%) | Gas amount (ml) |
|---|---|---|---|---|
| | Before storage | After storage | | |
| Ex. 25 | 1600 | 1347 | 84.2 | 6.5 |
| Ex. 26 | 1600 | 1346 | 84.1 | 6.4 |
| Ex. 27 | 1600 | 1336 | 83.5 | 6.6 |
| Ex. 28 | 1600 | 1333 | 83.3 | 6.3 |
| Ex. 29 | 1600 | 1325 | 82.8 | 6.4 |
| Comp. Ex. 16 | 1600 | 1274 | 79.6 | 7.0 |
| Comp. Ex. 17 | 1600 | 1267 | 79.2 | 6.8 |

From Table 10, it is clear that the batteries of Examples 25 to 29 containing various chain phosphoric acid esters exhibited excellent discharge capacity after storage similar to that of the battery of Example 4, suggesting that these batteries have the effect of suppressing the generation of gas. On the other hand, the battery of Comparative Example 16 containing a chain phosphoric acid ester having bulky molecules whose side chain contained more carbon atoms and the battery of Comparative battery 17 containing a cyclic phosphoric acid ester exhibited lower capacity recovery rate after storage than the batteries of Examples 25 to 29, and thus the effect produced by the addition of the phosphoric acid ester was not obtained. In the battery of Comparative Example 16 containing a phosphoric acid ester having a very large number of carbon atoms, even when the phosphoric acid ester decomposed, the effect of preventing the corrosion of aluminum foil serving as the positive electrode current collector by imide anions was not obtained. Similarly, even when a cyclic phosphoric acid ester was added as in the battery of Comparative Example 17, the effect of preventing the corrosion of aluminum foil serving as the positive electrode current collector by imide anions was not obtained. Presumably, this is because these phosphoric acid esters are difficult to decompose. This indicates that the number of carbon atoms contained in $R^3$ to $R^5$ of the chain phosphoric acid ester represented by the formula (2) is preferably 8 or less.

EXAMPLES 30 TO 59

In these examples, investigations were made on imide salts and phosphoric acid esters other than those described above.

With the reference electrolyte solution prepared above were mixed various imide salts and various chain phosphoric acid esters listed in Tables 11 and 12. Batteries of Examples 30 to 59 were produced in the same manner as in Example 1 except that these non-aqueous electrolyte solutions were used.

TABLE 11

| | Imide salt | Imide salt concentration (mol/L) | Phosphoric acid ester | Amount of phosphoric acid ester (ppm) |
|---|---|---|---|---|
| Ex. 30 | Lithium bis(trifluoromethansulfonyl)imide | 0.1 | Diethyl methyl phosphate | 300 |
| Ex. 31 | Lithium bis(trifluoromethansulfonyl)imide | 0.1 | Diethyl methyl phosphate | 100 |
| Ex. 32 | Lithium bis(trifluoromethansulfonyl)imide | 0.1 | Trifluoroethyl dimethyl phosphate | 100 |
| Ex. 33 | Lithium bis(trifluoromethansulfonyl)imide | 0.1 | Tris(trifluoromethyl)phosphate | 50 |
| Ex. 34 | Lithium bis(trifluoromethansulfonyl)imide | 0.1 | Tris(chloroethyl)phosphate | 50 |
| Ex. 35 | Lithium bis(trifluoromethansulfonyl)imide | 0.1 | Tris(tribromoneopentyl)phosphate | 50 |
| Ex. 36 | Lithium bis(trifluoromethansulfonyl)imide | 0.1 | Dipropyl methyl phosphate | 50 |
| Ex. 37 | Lithium bis(trifluoromethansulfonyl)imide | 0.1 | Tris(dichloropropyl)phosphate | 50 |
| Ex. 38 | Lithium bis(trifluoromethansulfonyl)imide | 0.1 | Tris(2,6-dimethylphenyl)phosphate | 50 |
| Ex. 39 | Lithium bis(trifluoromethansulfonyl)imide | 0.1 | Diethyl propyl phosphate | 50 |
| Ex. 40 | Lithium bis(trifluoromethansulfonyl)imide | 0.1 | Tris(trifluoroethyl)phosphate | 50 |
| Ex. 41 | Lithium bis(trifluoromethansulfonyl)imide | 0.1 | Dipropyl ethyl phosphate | 50 |
| Ex. 42 | Sodium bis(trifluoromethansulfonyl)imide | 0.05 | Triethyl phosphate | 100 |
| Ex. 43 | Potassium bis(trifluoromethansulfonyl)imide | 0.05 | Triethyl phosphate | 100 |
| Ex. 44 | $[(CF_3SO_2)_2N]_2Mg$ | 0.05 | Triethyl phosphate | 100 |

TABLE 12

| | Imide salt | Imide salt concentration (mol/L) | Phosphoric acid ester | Amount of phosphoric acid ester (ppm) |
|---|---|---|---|---|
| Ex. 45 | $[(CF_3SO_2)_2N]_2Ca$ | 0.05 | Triethyl phosphate | 100 |
| Ex. 46 | $[(CF_3SO_2)_2N]_2Sr$ | 0.05 | Triethyl phosphate | 100 |
| Ex. 47 | $[(CF_3SO_2)_2N]_2Ba$ | 0.05 | Triethyl phosphate | 100 |
| Ex. 48 | $[(CF_3SO_2)_2N]_2Al$ | 0.05 | Triethyl phosphate | 100 |
| Ex. 49 | Tetramethylammonium bis(trifluoromethansulfonyl)imide | 0.05 | Triethyl phosphate | 100 |
| Ex. 50 | Tetramethylammonium bis(trifluoromethansulfonyl)imide | 0.05 | Triethyl phosphate | 100 |
| Ex. 51 | Tetrabutylammonium bis(trifluoromethansulfonyl)imide | 0.05 | Triethyl phosphate | 100 |
| Ex. 52 | Tetraethylphosphonium bis(trifluoromethansulfonyl)imide | 0.05 | Triethyl phosphate | 100 |
| Ex. 53 | Tetrabutylphosphonium bis(trifluoromethansulfonyl)imide | 0.05 | Triethyl phosphate | 100 |
| Ex. 54 | Tetraethylphosphonium bis(trifluoromethansulfonyl)imide | 0.05 | Triethyl phosphate | 100 |

TABLE 12-continued

| | Imide salt | Imide salt concentration (mol/L) | Phosphoric acid ester | Amount of phosphoric acid ester (ppm) |
|---|---|---|---|---|
| Ex. 55 | Tetrabutylphosphonium bis(trifluoromethansulfonyl)imide | 0.05 | Triethyl phosphate | 100 |
| Ex. 56 | Ethyl methyl imidazolium bis(trifluoromethansulfonyl)imide | 0.05 | Triethyl phosphate | 100 |
| Ex. 57 | Methyl propyl imidazolium bis(trifluoromethansulfonyl)imide | 0.05 | Triethyl phosphate | 100 |
| Ex. 58 | Ethyl butyl imidazolium bis(trifluoromethansulfonyl)imide | 0.05 | Triethyl phosphate | 100 |
| Ex. 59 | Ethyl butyl imidazolium bis(trifluoromethansulfonyl)imide | 0.05 | Triethyl phosphate | 100 |

The batteries of Examples 30 to 59 were evaluated in the same manner as in Example 1. The results are shown in Table 13.

TABLE 13

| | Discharge capacity (mAh) | | Recovery rate (%) | Gas amount (ml) |
|---|---|---|---|---|
| | Before storage | After storage | | |
| Ex. 30 | 1600 | 1350 | 84.4 | 6.0 |
| Ex. 31 | 1600 | 1347 | 84.2 | 6.2 |
| Ex. 32 | 1600 | 1344 | 84.0 | 6.5 |
| Ex. 33 | 1600 | 1346 | 84.1 | 6.3 |
| Ex. 34 | 1600 | 1342 | 83.9 | 6.7 |
| Ex. 35 | 1600 | 1346 | 84.1 | 6.2 |
| Ex. 36 | 1600 | 1339 | 83.7 | 6.0 |
| Ex. 37 | 1600 | 1330 | 83.1 | 6.8 |
| Ex. 38 | 1600 | 1346 | 84.1 | 6.3 |
| Ex. 39 | 1600 | 1339 | 83.7 | 6.9 |
| Ex. 40 | 1600 | 1342 | 83.9 | 6.4 |
| Ex. 41 | 1600 | 1336 | 83.5 | 6.2 |
| Ex. 42 | 1600 | 1333 | 83.3 | 6.7 |
| Ex. 43 | 1600 | 1339 | 83.7 | 6.1 |
| Ex. 44 | 1600 | 1346 | 84.1 | 6.5 |
| Ex. 45 | 1600 | 1334 | 83.4 | 6.8 |
| Ex. 46 | 1600 | 1349 | 84.3 | 6.3 |
| Ex. 47 | 1600 | 1354 | 84.6 | 6.7 |
| Ex. 48 | 1600 | 1346 | 84.1 | 6.6 |
| Ex. 49 | 1600 | 1342 | 83.9 | 6.9 |
| Ex. 50 | 1600 | 1347 | 84.2 | 6.2 |
| Ex. 51 | 1600 | 1344 | 84.0 | 6.4 |
| Ex. 52 | 1600 | 1333 | 83.3 | 6.2 |
| Ex. 53 | 1600 | 1352 | 84.5 | 6.7 |
| Ex. 54 | 1600 | 1346 | 84.1 | 6.3 |
| Ex. 55 | 1600 | 1355 | 84.7 | 6.9 |
| Ex. 56 | 1600 | 1336 | 83.5 | 6.7 |
| Ex. 57 | 1600 | 1338 | 83.6 | 6.8 |
| Ex. 58 | 1600 | 1333 | 83.3 | 6.5 |
| Ex. 59 | 1600 | 1331 | 83.2 | 6.4 |

From Table 13, it is clear that the batteries of Examples 30 to 59 exhibited better discharge capacity after storage, higher recovery rate and less amount of gas generated during storage than the battery of Comparative Example 1. This result indicates that similar effects are obtained even when various imide salts and various chain phosphoric acid esters are used. Although the examples given above employ combinations of specific imide salts and specific chain phosphoric acid esters, similar effects are obtained with the use of combinations of imide salts and chain phosphoric acid esters other than those given above.

Although the examples given above employ lithium ion secondary batteries containing non-aqueous electrolyte solutions to describe the non-aqueous electrolyte secondary battery of the present invention, similar effects are obtained in lithium ion secondary batteries containing gel polymer electrolytes. Moreover, even in non-aqueous electrolyte secondary batteries other than lithium ion secondary batteries such as magnesium secondary batteries, aluminum secondary batteries and sodium secondary batteries, similar effects can be obtained.

As the electrode assembly of the non-aqueous electrolyte secondary battery, an electrode assembly in which positive and negative electrode plates are spirally wound with a separator interposed therebetween is described above, but the shape of the electrode assembly is not limited thereto. Similar effects can be obtained even when a stack electrode assembly in which positive and negative electrode plates are stacked with a separator interposed therebetween is used. The non-aqueous electrolyte secondary batteries described above employ a cylindrical metal case, but the shape of the non-aqueous electrolyte secondary battery of the present invention is not limited thereto. Similar effects can be obtained even when the battery of the present invention is a prismatic battery, a coin-type battery or a sheet-type battery whose outer case is made of a laminate sheet comprising an aluminum metal foil sandwiched between polyolefin resin layers.

INDUSTRIAL APPLICABILITY

According to the present invention, it is possible to provide a highly reliable non-aqueous electrolyte secondary battery that exhibits good discharge capacity recovery rate after storage and suppresses the generation of gas even when the battery is stored at high temperatures. The non-aqueous electrolyte secondary battery of the present invention is useful as a power source for driving electronic devices such as notebook computers, cell phones and digital still cameras.

The invention claimed is:

1. A non-aqueous electrolyte secondary battery comprising a positive electrode plate, a negative electrode plate, and a non-aqueous electrolyte comprising a non-aqueous solvent and a solute dissolved in said non-aqueous solvent,
wherein said non-aqueous electrolyte further comprises a chain phosphoric acid ester and at least one imide salt represented by the formula (1):

[Chemical formula 1]

where $R^1$ and $R^2$ each independently represent $C_nX_{2n+1}$, X represents a hydrogen atom or halogen atom, and n is an integer equal to or greater than 1, said chain phosphoric acid ester is at least one compound represented by the formula (2):

[Chemical formula 2]

where $R^3$, $R^4$ and $R^5$ each independently represent $C_m Y_{2m+1}$, $C_m Y_{2m}$, $C_6 H_5$ or $C_m Y_{2m+1}$—$C_6 H_4$, Y represents a hydrogen atom or halogen atom, and m is an integer from 1 to 8, the amount of said chain phosphoric acid ester is 50 to 1000 ppm relative to the total weight of said non-aqueous electrolyte, said imide salt in said non-aqueous electrolyte has a concentration of 0.1 to 0.5 mol/L, and said positive electrode plate comprising an aluminum current collector.

2. The non-aqueous electrolyte secondary battery in accordance with claim 1,
wherein $R^1$ and $R^2$ in said formula (1) each independently represent $C_n X_{2n+1}$, where n is 1 to 6.

3. The non-aqueous electrolyte secondary battery in accordance with claim 1,
wherein the concentration of said imide salt in said non-aqueous electrolyte does not exceed the a concentration of said solute in terms of mol/L.

* * * * *